(12) United States Patent
Atsumi et al.

(10) Patent No.: US 7,463,787 B2
(45) Date of Patent: Dec. 9, 2008

(54) PICTURE EDITING

(75) Inventors: Eiji Atsumi, Janagawa-Ken (JP); Jerome Piat, Tokyo (JP)

(73) Assignee: Nokia Corporation, Espoo (FI)

( * ) Notice: Subject to any disclaimer, the term of this patent is extended or adjusted under 35 U.S.C. 154(b) by 376 days.

(21) Appl. No.: 10/482,114

(22) PCT Filed: Jul. 1, 2002

(86) PCT No.: PCT/IB02/02571

§ 371 (c)(1), (2), (4) Date: Nov. 14, 2005

(87) PCT Pub. No.: WO03/003712

PCT Pub. Date: Jan. 9, 2003

(65) Prior Publication Data

US 2006/0165291 A1    Jul. 27, 2006

(30) Foreign Application Priority Data

Jun. 29, 2001    (EP) ................................ 01305688

(51) Int. Cl.
     *G06K 9/38*      (2006.01)
(52) U.S. Cl. ...................... 382/272; 382/195; 382/190; 358/540

(58) Field of Classification Search ................ 382/272, 382/160, 165, 224, 228, 229, 220
See application file for complete search history.

(56) References Cited

U.S. PATENT DOCUMENTS

| 5,581,377 | A | * | 12/1996 | Shimizu et al. | 358/540 |
| 5,901,245 | A | * | 5/1999 | Warnick et al. | 382/190 |
| 6,069,713 | A | * | 5/2000 | Kusama | 358/452 |
| 6,349,153 | B1 | * | 2/2002 | Teo | 382/294 |
| 6,385,349 | B1 | * | 5/2002 | Teo | 382/284 |
| 6,711,291 | B1 | * | 3/2004 | Stubler et al. | 382/195 |

FOREIGN PATENT DOCUMENTS

| EP | 0 647 057 A1 | 4/1995 |
| EP | 0 822 710 A2 | 2/1998 |

* cited by examiner

*Primary Examiner*—Jingge Wu
*Assistant Examiner*—Tsung-Yin Tsai
(74) *Attorney, Agent, or Firm*—Squire, Sanders & Dempsey L.L.P.

(57) ABSTRACT

A method of inserting an object into an image, the method comprising the steps of assessing the homogeneity of the image; identifying one or more areas of the image having similar homogeneity according to the assessed homogeneity; and selecting a homogeneous area in which to insert the object.

34 Claims, 4 Drawing Sheets

PICTURE EDITING

The present invention relates to a method of inserting an object into an image and an object insertion apparatus, particularly but not exclusively suitable for use in a mobile phone or a personal digital assistant.

There are a number of known apparatus which provide a facility to display and edit an image. One example is a picture which has been scanned using a scanner and then displayed on a computer using the appropriate software. Another example is a photograph take by a digital camera which has been digitised and then re-displayed on a computer. A third example is a computer-generated image. The computer could take the form of a personal computer but could also be a mobile phone or a personal digital assistant having the facility to display pictures. In all cases it is often possible to add an object such as a character string into the picture, for example a message to someone or information about the picture such as the location and date it was taken. It is also usual to be able to send the modified picture, for example over the internet by e-mail or to another mobile phone user.

When inserting an object such as a character string into a picture, several requirements must be borne in mind. Firstly, the character string must be able to fit into the picture. The size of the picture and the size and type of font are important considerations in this case. Secondly, the character string must be visible in the picture. This means that it must be of a colour which contrasts with the area of the picture in which it is situated. Thirdly, the character string must not obscure important features of the picture. Thus it is desirable for the character string to be positioned in large areas displaying homogeneity of colour or brightness or some other suitable parameter, rather than in areas with a lot of detail. For example, a large area of sky is often a suitable location, whereas an area containing people is not a good location since these are features which should not be obscured.

Known systems for inserting a character string into a picture are manual systems which invite the user to manually select the location in the picture into which to insert the character string. This type of manual insertion is sometimes achieved by selection with a mouse, but, more likely, especially with small-screened devices such as those mentioned above, it will be done by the use of arrow keys. This causes problems because such a system is not very accurate on a small screen since even one press of an arrow key can move the potential insertion position by a considerable amount relative to the size of the screen. This in turn means that the character string is often not inserted in the position which the user had in mind but instead in a less desirable position which obscures an important feature of the picture, such as a face. Another problem is that it is rather time-consuming to place a character string in this manner.

One known solution to the problem of accuracy of character string insertion position is to provide a zoom function. This means that the user can zoom in on the general area of the picture in which they wish to insert the character string so that subsequent movement of the positioning controls such as arrow keys does not vary the potential insertion position by such a large amount and hence the position of insertion can be chosen more accurately. However, the problem with this solution is that having zoomed in, it is then possible that the character string will not fit into the visible area of the picture. This means that whilst positioning the character string when zoomed in, it is difficult for the user to assess whether the character string will be suitably located within the whole picture. Thus it is likely that several cycles of zooming in and out will be required to correctly position the character string.

It is possible within this solution to provide a scrolling function together with the zoom function so that the user can view the full extent of the character string in the picture, but nevertheless not all at once. This is consequently likely to require several scrolling operations before satisfactory positioning is achieved. Clearly both variations to this solution are cumbersome and time-consuming.

A related problem is that in known systems it is not always possible for the user to conveniently select character string characteristics such as font size, type and colour. Often the default font is not suitable for a particular picture due to its size or colour, as discussed above. Thus in known systems, either the character string is too small or so big that it obscures much of the picture. On the other hand, known systems which require the user to select character string characteristics are time-consuming for the user.

It would be desirable to provide a way of inserting an object such as a character string into an image which at least partially automates the process of selecting the insertion position and ensures that suitable characteristics such as font characteristics are used. It would also be desirable to retain some degree of user control to allow the user flexibility in where to insert objects and what fonts to use. It would be desirable if such a method were more convenient and quicker for the user than known systems.

According to the present invention there is provided a method of inserting an object into an image, the method comprising the steps of: assessing the homogeneity of the image; identifying one or more areas of the image having similar homogeneity according to the assessed homogeneity; and selecting a homogeneous area in which to insert the object.

The present invention also provides an object insertion apparatus comprising: an image homogeneity assessor for assessing the homogeneity of an image; an area identifier for identifying one or more areas of the image having similar homogeneity according to the assessed homogeneity; and a selector for selecting a homogeneous region in which to insert the object.

The homogeneity is suitably colour homogeneity. The colour homogeneity may be homogeneity of hue and/or brightness.

The homogeneity may be assessed by evaluating a colour number of each pixel of the image.

The selection of the area may be performed manually by a user (preferably by selection from two or more automatically identified areas) or automatically.

The method may comprise the further steps of: evaluating the size of each area; and evaluating the variation in colour within each area.

The step of evaluating the size of each area may be performed by counting the number of pixels in each area and the step of evaluating the variation in colour within each area is carried out by applying a mathematical transformation to the colour number of each pixel in an area to evaluate a rate of change of colour over each area.

The method may comprise the further step of, for each area, calculating a value representative of the average colour in the area.

The step of selecting a homogeneous area in which to insert the object may be performed by the steps of: retrieving default object characteristics from memory; first ranking the areas in order of size, largest first; second ranking the areas in order of rate of change of colour over each area, lowest first; comparing the default object colour to the average colour in each area and third ranking the areas in order of contrast to the default character string colour, greatest contrast first; applying a weighting factor to the size, rate of change of colour and average colour of each area; overall ranking the regions in which the object would fit in an order based on their first, second and third rankings and the applied weighting factor., and selecting the area in which to insert the object that has the highest overall ranking.

The method may comprise the further steps of calculating the space required for the object using default characteristics, comparing the calculated space requirement to the evaluated size of each area and using the comparison to decide in which of the areas the object would fit, wherein if the object would not fit in any of the areas, setting an area flag and reducing the object size until the object would fit in at least one of the areas.

The method may comprise the further step of retrieving from memory a pre-determined value of minimum contrast of default object colour to average colour in an area and if none of the areas satisfies the minimum pre-determined value, setting a contrast flag and modifying the colour of the object to be inserted so that at least one of the areas satisfies the criteria.

The method may comprise the further step of retrieving from memory a pre-determined value of maximum permissible rate of change of colour over an area and if all of the areas have a greater rate of change of colour than the maximum permissible rate, setting a variation flag and issuing a warning to the user and allowing the user to select a location for insertion of the object.

If the area flag is set and the contrast flag is set and the variation flag is set, a user may suitably be allowed to modify the object size.

The method may further comprise the step of inserting the object in the selected area.

The method may comprise the further step of, after inserting the object in the selected area, allowing the user to move the object by manual control means.

The method may comprise the further steps of allowing the user to select characteristics of the object and modifying the object according to the selected characteristics.

The method may comprise the further steps of requesting confirmation from the user that the object has been inserted satisfactorily and if the user indicates that it has, saving the image having the inserted object, but if the user indicates that the object has not been inserted satisfactorily, allowing the user to move the object and/or modify the characteristics of the object.

The object may be a character string, preferably a text string. The object may be or include an image, preferably a line image or drawing. The object is preferably monochrome.

The method is suitably applied to a mobile telephone and/or a personal digital assistant.

An embodiment of the invention will now be described, by way of example only, with reference to the accompanying drawings in which.

In the figures, like reference numerals indicate like parts.

Figure 1A:
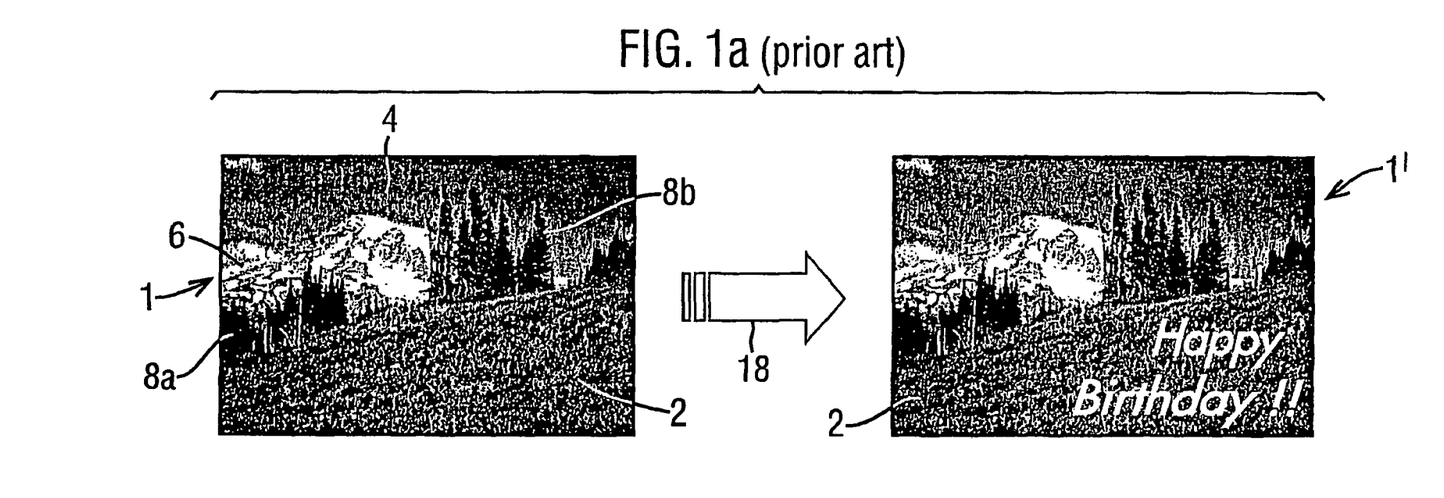
FIGS. 1a and 1b show insertion of a character string into pictures in accordance with the prior art.

FIG. 1a shows a typical photograph of a landscape, indicated generally by reference numeral 1. The picture 1 comprises four main area types. These are a grass area 2, a sky area 4, a mountain area 6 and two tree areas 8a (on the left hand side of the picture) and 8b (on the right hand side of the picture).

Figure 1B:
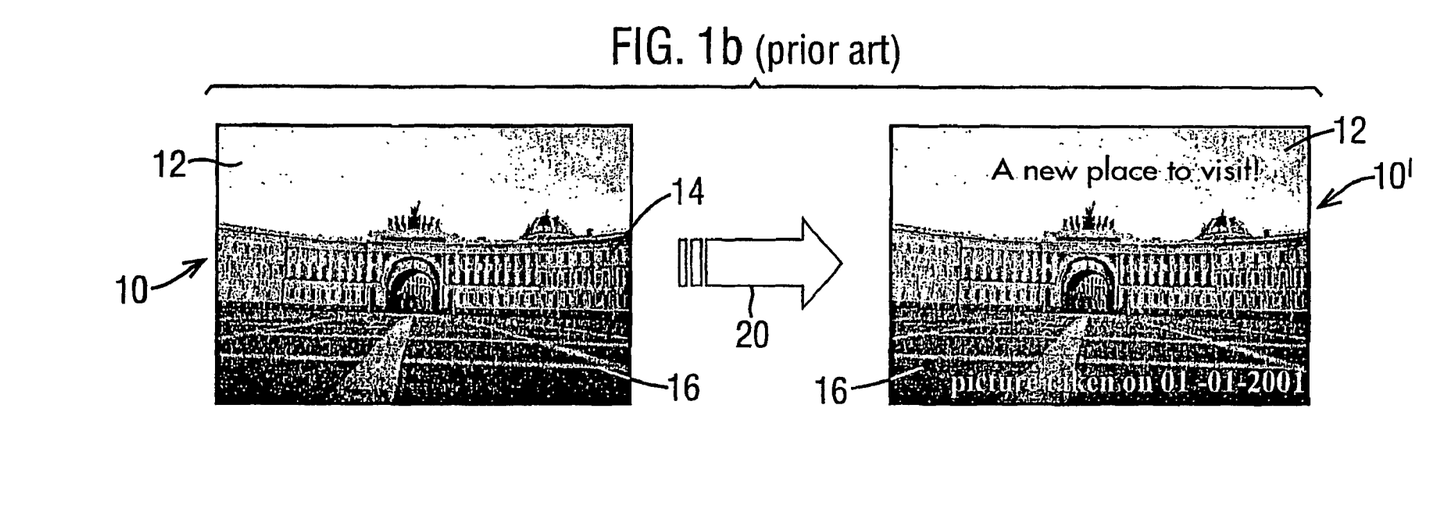

FIG. 1b shows a typical photograph of a building, indicated generally by reference numeral 10. This has three main area types. These are a sky area 12, a building area 14 and a ground area 16.

Arrow 18 in FIG. 1a and arrow 20 in FIG. 1b represent an editing process in accordance with the prior art, whereby one or more character strings are manually inserted in pictures 1, 10 by a user.

Turning back to FIG. 1a, edited picture 1' has the phrase "Happy Birthday!!" inserted into grass area 2. This area has been chosen by the user because it is the largest relatively homogeneous area in the picture 1. However, the positioning within grass area 2 of the words "Happy" and "Birthday" is not accurately controllable, with the result that they are not positioned and aligned in an optimum manner.

Looking again at FIG. 1b, edited picture 10' has had two character strings inserted into it. The first, "A new place to visit!" has been inserted in sky area 12 and the second, "picture taken on 01-01-2001" has been inserted in ground area 16. It can be seen that neither string is aligned centrally in the widthwise direction but rather, due to the inaccurate way of specifying insertion position, they are both squashed into the right hand side of the picture 10'.

Figure 2:
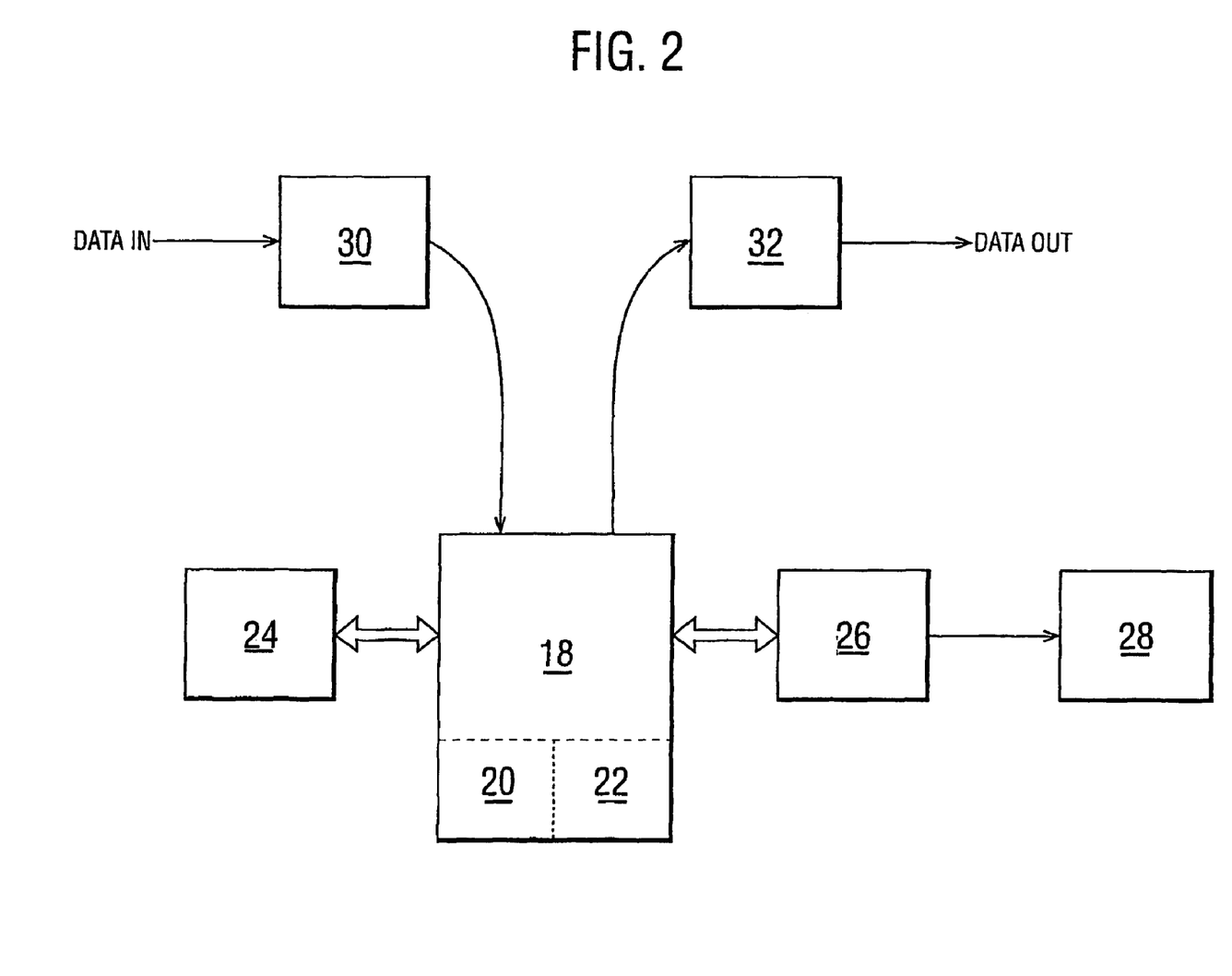
FIG. 2 is a schematic layout of components of a mobile phone

FIG. 2 shows some components of a mobile phone which are used in an embodiment of the invention. There is shown a central microprocessor 18 which has associated with it a RAM 20 and a ROM 22. Either or both of these memories could alternatively be located separately from microprocessor 18. There is associated with microprocessor 18 a keyboard 24 and a display driver 26. Display driver 26 drives a display 28. Microprocessor 18 receives input from a data receiver 30 and outputs to a data transmitter 32.

In operation, data receiver 30 receives data that, among other things, contains decoded images such as pictures. These images include pictures that have been scanned using a scanner and photographs which have been taken with a digital camera as well as computer-generated images and the like. They may also be received as part of a mobile phone message, for example a text message. The following description will make reference to pictures 1, 10 of FIG. 1 by way of example. The data receiver 30 manipulates the received data including any pictures as necessary and passes the information to the microprocessor for storage in RAM 20 or ROM 22 as appropriate.

Keyboard 24 takes the form of a set of keys for numbers and a few extra keys such as an on/off switch, a menu key and arrow keys. The number keys are configured in the usual way to allow text input as well as number input. In addition to the usual keyboard functions of a mobile phone, a user of the mobile phone in accordance with the embodiment uses the keyboard 24 to recall pictures from memory 20, 22 and edit them with objects such as character strings. The number keys and menu keys are used in a known manner to enter a character string. The user is presented with an option for specifying that the character string is complete and then a further option to accept it for insertion into a picture or to reject it and return to edit mode. Once accepted, a character string is stored in RAM 20. The subsequent insertion of an accepted character string will be described below. By "character string" is meant any combination of letters, numbers or symbols which are accessible via the keyboard. Character strings are used as the example in the following description, with reference to FIG. 1, however, the invention is not limited to character strings but is equally applicable to other objects such as images which have been created by the user at the mobile phone or have been received in a similar manner to the image being edited.

When a user recalls a picture from memory 20, 22 the microprocessor 18 also interacts with display driver 26 to drive display 28 to display the picture. Any subsequently entered text will also be conveyed to display 28 in this manner.

When a user has edited a picture to their satisfaction, it can be stored in ROM 22 for later use, or, if the user simply wishes to send it as a message, it can be stored temporarily in RAM 20. When the user chooses the "send" option, the message including the picture is sent by the microprocessor 18 to transmitter 32. In transmitter 32 it is suitably configured for transmission to another mobile phone or to be sent via e-mail.

The insertion of a character string into a picture in accordance with an embodiment of the invention will now be described with reference to FIG. 3.

Figure 3:
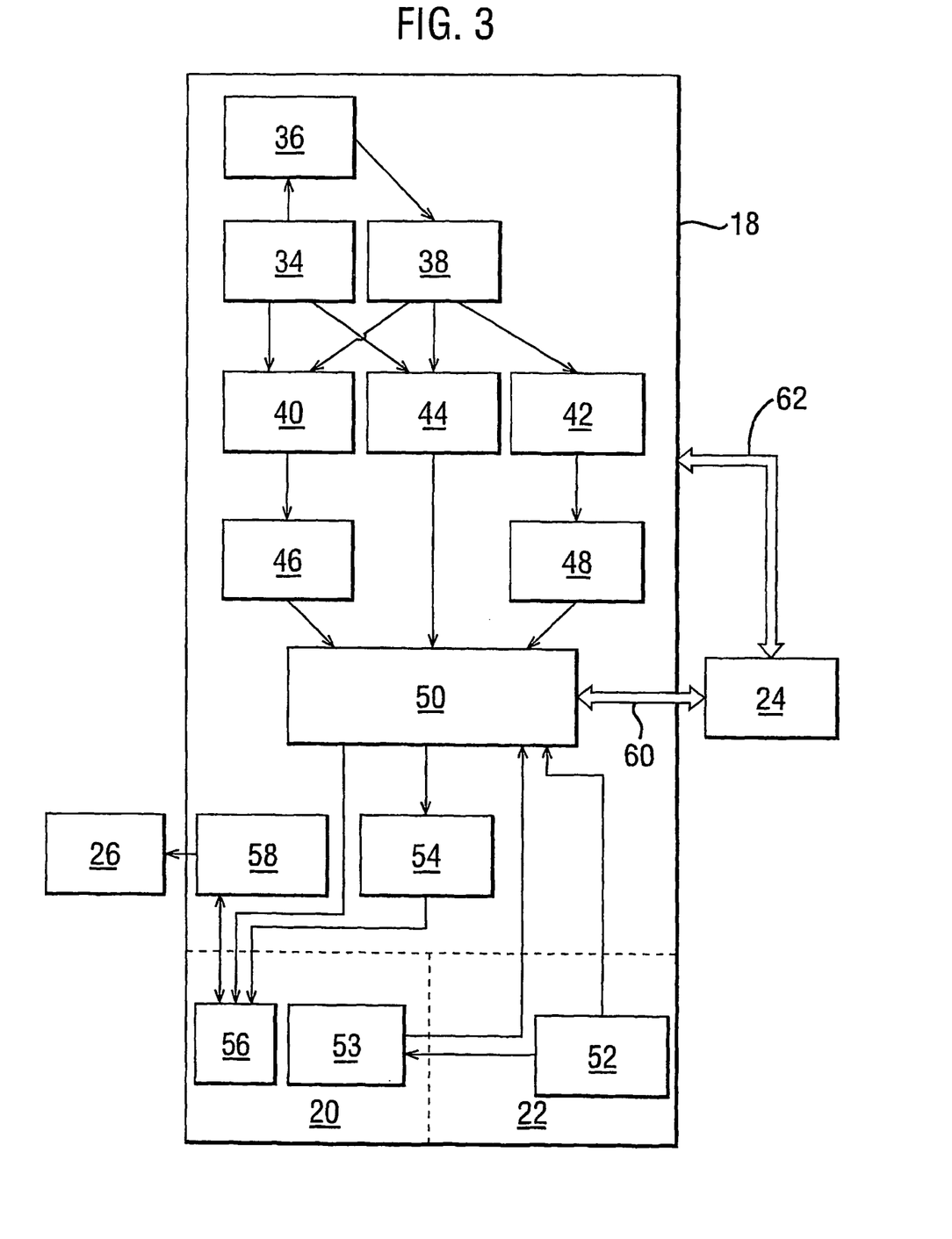
FIG. 3 is a detail of part of FIG. 2

FIG. 3 shows a detail of part of FIG. 2. The microprocessor 18 is shown in an enlarged view together with RAM 20 and ROM 22. Keyboard 24 and display driver 26 are also shown but the remaining components of FIG. 2 are omitted.

Within microprocessor 18 are provided a colour number reader 34, connected to a colour homogeneity assessor 36. Colour number reader 34 is also connected to a frequency analyser 40, an average colour assessor 44 and an area segmentor 38. Area segmentor 38 is also connected to frequency analyser 40 and average colour assessor 44 and is additionally connected to a pixel counter 42. Frequency analyser 40 is connected via a rate of change of colour ranker 46 to a comparator 50. Average colour assessor 44 and pixel counter 42 are also connected to comparator 50, pixel counter 42 via an area size ranker 48. Comparator 50 interacts with keyboard 24 (shown by double-ended arrow 60) and keyboard 24 has additional interactive connections to microprocessor 18 which are represented by double-ended arrow 62. Comparator 50 receives additional input from default storage 52 which forms part of ROM 22 and character string size calculator 53 which forms part of RAM 20.

Comparator 50 outputs to result store 56 and a contrast ranker 54, which is also connected to result store 56. Result store 56 forms part of RAM 20. Result store 56 inputs to an area selector 58, which outputs to display driver 26.

All the entities within microprocessor 18 detailed above would in practice be achieved by one or more microchips and suitable coding. FIG. 3 is drawn schematically to aid in explanation of the embodiment.

In operation, a user recalls a picture from memory 20, 22 as described above with reference to FIG. 2. This is at least in part achieved by connections between the keyboard 24 and microprocessor represented by arrow 62 and internal connections within microprocessor 18, such as connections to RAM 20 and ROM 22 which are omitted from FIG. 3 in the interests of clarity. Such connections are known in the art. The user then creates a character string to be inserted in the picture as described above. Having accepted the character string, the embodiment of the invention works as follows to insert the character string in the picture.

Firstly, colour number reader 34 scans the picture and reads the colour number of each pixel in the picture. The colour number represents the colour of the pixel and is actually comprised of relative strengths of red, green and blue light. This information is passed onto colour homogeneity assessor 36 which uses the information to evaluate the colour homogeneity of the picture. This process involves identifying areas of generally similar colour. For example, referring back to FIG. 1a, the grass area 2 would be identified as an area of homogeneity because, even though the exact shade of green varies across the area, a high percentage of the pixels in that area will have a colour number representing a shade of green and hence the homogeneity assessor 36 will group them together. Similarly, the entire sky area 4 would be grouped together because even though there are some clouds present, they are small in comparison to the sky area 4 and in comparison to the size of the picture.

The information on colour homogeneity is passed onto area segmentor 38. Area segmentor 38 specifically identifies areas of the picture for subsequent consideration for insertion of the character string. For example, the information from colour homogeneity assessor 36 with respect to FIG. 1 will identify two areas of trees 8a and 8b. Area segmentor 38 will be able to recognise that these two areas have a very similar range of colour numbers but that they are separated by a significant amount of the picture and hence will treat them as two separate areas. It also decides how to segment areas of variable homogeneity, for example homogeneity assessor 36 will recognise that building area 14 in FIG. 1b is a different area from the sky area 12 and the ground area 16 but the information on the building area 14 passed onto area segmentor 38 indicates it to have quite a variation in colour. However, segmentor 38 recognises that the variation is actually quite uniform and will therefore identify the entire building as one area. It can be understood that certain rules are applied in segmenting the areas in terms of size of areas and allowable amount of variation of colour so that only a few main areas are chosen. In other words, small variations in colour over small areas of the picture are ignored.

Using the above system, FIG. 1a would be segmented into five areas 2, 4, 6, 8a, 8b and FIG. 1b would be segmented into three areas 12, 14, 16. The areas are defined by the position within the picture of their boundary pixels. It is not a requirement to segment the entire picture into areas. If certain regions display very little homogeneity segmentor 38 does have the option of simply ignoring them at this stage. Having segmented the picture into areas, one of these areas is chosen for insertion of the character string. In order for the area to be chosen, three parameters are considered.

The first parameter is the rate of change of colour of each area. This is important because it is preferable to insert the character string in an area of homogeneous colour, so as not to obscure important features of the picture, as discussed above. This is calculated by frequency analyser 40 which receives colour number information from colour number reader 34 and is also informed by area segmentor 38 of the exact areas of the picture for which rate of change of colour is to be calculated. It applies a Fourier transform or other mathematical transformation to the colour number information and area information to calculate the rate of change of colour within each area. This gives an indication of the variation of colour within each area. For example, the building area 14 of FIG. 1b would have a higher rate of change of colour than the sky area 12.

The information on rate of change of colour within each area is forwarded to rate of change of colour ranker 46. Ranker 46 ranks the areas in order of suitability for insertion of the character string based on their rate of change of colour, which means the area with the lowest rate of change is ranked highest. Both the rankings and the rates of change are passed onto comparator 50.

The second parameter is the average colour of each area. This needs to be considered because the area in which the character string is to be inserted must have sufficient contrast with the colour of the character string in order that the character string will be clearly visible. Thus colour number information is passed from colour number reader 34 and area information is passed from area segmentor 38 to average colour calculator 44. Average colour calculator 44 uses these two pieces of information to calculate a value for average colour of each area, in terms of a colour number, and passes this information onto comparator 50.

The third parameter is the area size. This is important because the character string should ideally fit within the chosen area of insertion so that it does not impinge on other areas and consequently obscure important features of the picture. Information about the areas is passed from area segmentor 38 to pixel counter 42. Pixel counter 42 counts the number of pixels in each area and uses the results to calculate the size of each area.

The size of each area is passed onto area size ranker 48 which ranks the areas in order of suitability for insertion of the character string based on their size. The larger the area, the higher it is ranked. The sizes of areas and rankings are passed onto comparator 50.

Within ROM 22, default storage 52 stores default character string characteristics. These represent the characteristics of the default character string which are specified automatically by the microprocessor 18, such as font type, font size and colour. There is also stored a value representing the maximum rate of change of colour within an area which is acceptable for insertion of a character string. There is additionally stored a value representing the minimum contrast in colour between the character string and an area of the picture which is acceptable for insertion of a character string. This information is also passed to comparator 50.

Within RAM 20, character string size calculator 53 receives the information on the default character string characteristics from default storage 52 and applies this to the particular character string to be inserted so as to calculate the area required to accommodate the character string in the picture. This calculation takes into account truncation rules for displaying long character strings on more than one line.

Comparator 50 carries out a number of tasks as follows.

Firstly it compares the value representing the maximum rate of change of colour within an area received from default storage 52 with the rates of change received from frequency analyser 40 and rate of change of colour ranker 46. If none of the areas is found to satisfy the criteria of having a rate of change lower than the maximum value received from default storage 52 ("variation criteria"), a variation warning flag is set. If at least one of the areas does have a rate of change lower than the maximum value received from default storage 52, the warning flag is not set. In the latter case, the comparator consequently ascertains which of the areas satisfies the variation criteria.

Secondly it compares the average colour of each area received from average colour calculator 44 and compares it to the default character string font colour received from default storage 52. These values are then compared to the value representing the minimum contrast in colour between the character string and an area of the picture that was received from default storage 52. If none of the areas is found to satisfy the criteria of having at least the minimum contrast ("contrast criteria"), a contrast warning flag is set. If at least one of the areas has the minimum contrast, the warning flag is not set. In the latter case, the comparator consequently ascertains which of the areas satisfies the contrast criteria.

Thirdly it compares the area sizes received from pixel counter 42 and area size ranker 48 to the area required to accommodate the character string received from character string size calculator 53 to ascertain whether any of the areas is large enough to accommodate the character string. If none of the areas is found to satisfy the criteria of being large enough ("size criteria") a size warning flag is set. If at least one of the areas is large enough, the size warning flag is not set. In the latter case, the comparator consequently ascertains which of the areas satisfies the size criteria.

The comparator 50 then checks to see whether the three flags, variation warning flag, the contrast warning flag and the size warning flag are set. If all three flags are set, this indicates that none of the areas satisfies even one of the above-mentioned three criteria. In this case, a message is conveyed to the user via connection 60 and display driver 24. In this embodiment, the user is then invited to specify a smaller font size than the default font size. In the interests of the system being user-friendly, the user is only asked to modify this one parameter. The character string size calculator 53 then re-calculates the area required by the character string and passes this value to comparator 50. Comparator 50 then performs the calculation to ascertain whether any of the areas is large enough to accommodate the character string. If they are not, the user loop is repeated until the character string is small enough to be accommodated in one of the areas.

Figure 4A:
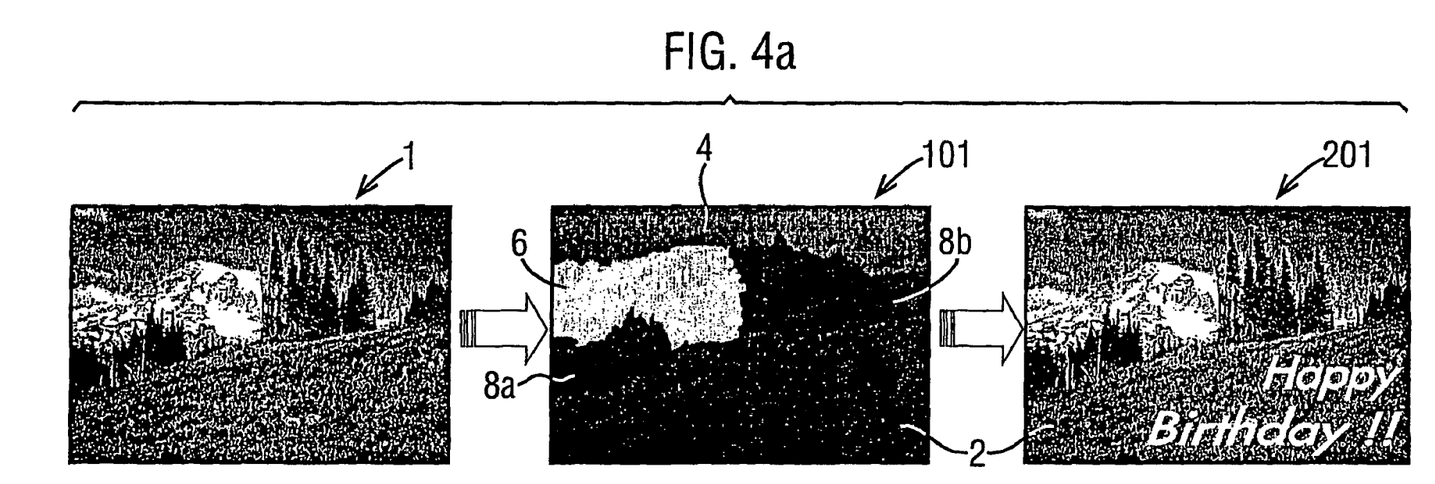
FIGS. 4a and 4b show insertion of a character string into the pictures of FIG. 1 in accordance with the invention.
Figure 4B:
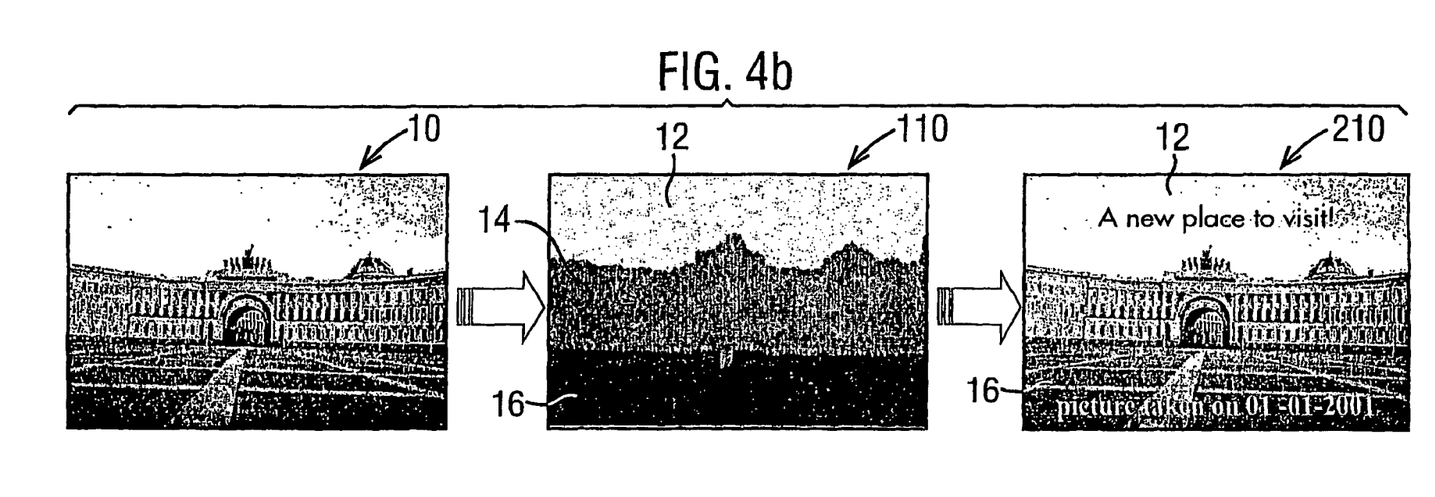

If it is not possible to fit the character string in any of the areas even using the smallest available font, the user is invited to specify a closer font type. If this proves unsuccessful, the user is invited to choose a different font colour in order to satisfy the contrast criteria instead. If this does not work, as a last resort, the user is invited to choose the area in which the character string should be inserted. In order to carry out this last option, the display would need to show the areas to the user. It would do this by showing the picture with each area shown entirely in one colour (and assigning a number to each area) as can be seen in FIG. 4 (reference numerals 101 and 110). Since the user has then chosen the area, the following procedure for choosing the area would not be required.

Once the situation has been reached whereby none of the three flags is set, or only one or two of the three flags are set, all the information held by comparator 50 is passed onto result store 56, with the exception of the contrast information. The contrast information is passed to contrast ranker 54 which ranks the areas in order of suitability for insertion of a character string based on their contrast with the default font colour. The results are then passed onto result store 56.

Thus result store 56 holds the results of the calculations performed in frequency analyser 40, pixel counter 42 and average colour calculator 44. It also holds a ranking of the areas for each of the three parameters—colour variation, contrast and size—as well as an indication of which areas satisfy the criteria for which parameters. It additionally holds information on whether any of the three flags are set and hence knows if one, two or three of the criteria are not satisfied for any of the areas.

In order to select an area in which to insert the character string, area selector 58 accesses result store 56. The procedure for choosing the area in which to insert the character string depends on the particular situation as follows:

(i) If two of the flags are set, it looks to see which of the areas satisfies the other criteria and chooses the highest ranked area with respect to that parameter from those areas.

(ii) If one or none of the flags is set and if all areas satisfy all criteria or all areas only satisfy one criteria (different from the one criteria of other areas) or all areas only satisfy two criteria, it applies a weighting to the rankings for each of the three criteria and carries out an optimisation calculation to choose an optimum area.

(iii) If one or none of the flags is set and if some of the areas satisfy all criteria, some satisfy one and some satisfy two, it will firstly eliminate the worst areas by number of criteria not satisfied so that those remaining satisfy the same number of criteria. It then applies a weighting to the rankings for each of the three criteria and carries out an optimisation calculation to choose an optimum area.

Thus in all cases the optimum area is chosen by way of assessing the area having the highest overall ranking. The weighting factors are stored in ROM 22 and can be programmed in dependence on the importance it is desired to give to each parameter.

The system could select a single area in this way. Alternatively it could determine two or more candidate areas (for instance all the determined areas that are characterised by a relative commonality of colour over a predefined range, or those of the determined areas that best meet the criteria programmed into the system for selection of areas) and then allow a user to select between them Having chosen the area by one of processes (i)-(iii) or by manual selection by the user (for instance due to difficulty in meeting the criteria) area selector 58 sends the result by way of an instruction to display driver 26 which positions the character string as instructed. Exact placement of the character string depends on the shape of the chosen area and its location within the picture. This can be understood with reference to FIG. 4.

FIG. 4a shows picture 1 being segmented into the previously discussed areas (reference numeral 101). It can be seen that each areas is shaded in one colour so that no variation in colour within an area is apparent. This would be the view shown to the user in any situation in which manual selection of the area is required. This picture can be generated and displayed via display driver 26 as soon as area segmentor 38 has defined the areas. In the present embodiment further calculations are performed to insert the character string but in an alternative embodiment the user could be asked to choose the area at this stage.

In this embodiment, the character string is placed by the microprocessor 18 as described above and it can be seen in the version of the picture indicated by reference numeral 201 that grass area 2 has been chosen. It will be recalled from FIG. 1 showing the prior art situation that this was also the area selected manually by a user. Since this area has a greater height at the right hand side of the picture, the text is positioned to the right hand side so that text of a larger font fits than would fit if the left hand side of grass area 2 were used. It is also aligned for optimum visual appeal by automatically making best use of the shape of grass area 2.

FIG. 4b shows a similar result for picture 10, with the segmented picture indicated by reference numeral 110. The picture with the character string inserted is indicated by reference numeral 210. Again it can be seen that the areas chosen for insertion of the text are the same as those selected by a user in accordance with the prior art situation of FIG. 1. However, with the character string being positioned in accordance with the embodiment the two character strings are optimally aligned within their respective areas since inaccuracies which are present when selecting a character string position using arrow keys have been eliminated. This means the text in area 12 is centralised widthwise and the text in area 16 is also centralised widthwise as well as being placed closer to the bottom of the picture. Thus the embodiment is able to recognise that the selected area is at the bottom of the picture and that it would be more visually pleasing to put the text close to the bottom so as to avoid the central area of the picture.

Other criteria are available for positioning a character string within an area depending on the location of the chosen area within the picture.

Having placed the character string in the picture, user approval is requested. If user approval is not given, the user is given the option of modifying the character string, the character string characteristics or manually altering the position of the character string, either tweaking within the chosen area or by specifying a different area. There is also an option to change the number of lines over which the character string is written. However, since character string position will have already been optimised by the embodiment, it is envisaged that a large number of modifications should not be required.

Once user approval is given, the modified picture is stored in RAM 20 or ROM 22 for transmission in a message, as described earlier.

As an alternative to user-selection of the colour of the text or other object to be inserted, the system could automatically select a colour for the text/object to be inserted. To do this the system analyses the colour characteristics of the area in which the text/object is to be inserted and selects a colour that has sufficient contrast that it will be clearly visible when inserted over the area. The analysis of the colour characteristics of the area could involve determining a mean colour value for the area. The system could then select a text/object colour that provides contrast from that average colour. The system could select two or more contrasting colours and allow a user to select between them. The system could also select a size for the text/object to be inserted, or select two or more sizes and allow the user to choose between them, on the basis of optimising the contrast between the text/object and the background image.

It can be understood that the described embodiment provides a significant improvement over known systems for inserting a character string in a picture by automating some or all of the procedure. Thus it is a far less cumbersome system for the user. However, should the user wish to exercise control over the position and characteristics of the character string this is also possible. The microprocessor 18 can be programmed to allow any combination of partially manual to fully automatic character string insertion.

The precise methodology of the embodiment need not be adhered to. For example, the ranking of areas is not an absolute requirement since all subsequent calculations could alternatively be carried out using only the results of the calculations performed in frequency analyser 40, pixel counter 42 and average colour calculator 44. Instead of requesting user input when none of the criteria are satisfied, the font size, font type or colour could be altered automatically until at least one of the criteria was satisfied for one of the areas. It would be possible to be more particular about satisfying the criteria and to alter more than one parameter with the aim of choosing an area which satisfies all the criteria if at all possible. Instead of using colour as a basis for assessing homogeneity and contrast, brightness could be used. A similar method could be applied to a personal digital assistant or a personal computer.

The invention claimed is:

1. A method comprising:
   assessing homogeneity of an image;
   identifying one or more areas of the image having similar homogeneity according to the assessed homogeneity; and
   selecting a homogeneous area in which to insert an object, wherein the selecting of the homogeneous area comprises
      retrieving default object characteristics from memory;
      first ranking the areas in order of size, largest first;
      second ranking the areas in order of rate of change of colour over each area, lowest first;
      comparing the default object colour to the average colour in each area and third ranking the areas in order of contrast to the default character string colour, greatest contrast first;

applying a weighting factor to the size, rate of change of colour and average colour of each area;

overall ranking the regions in which the object would fit in an order based on their first, second and third rankings and the applied weighting factor; and selecting the area in which to insert the object that has the highest overall ranking.

2. A method according to claim 1, wherein homogeneity is colour homogeneity.

3. A method according to claim 2, wherein homogeneity is assessed by evaluating a colour number of each pixel of the image.

4. A method according to claim 3, further comprising:
evaluating a size of each area; and
evaluating a variation in colour within each area.

5. A method according to claim 4, wherein the evaluating the size of each area comprises counting the number of pixels in each area and the evaluating the variation in colour within each area comprises applying a mathematical transformation to the colour number of each pixel in an area to evaluate a rate of change of colour over each area.

6. A method according to claim 5, further comprising, for each area, calculating a value representative of the average colour in the area.

7. A method according to claim 1, further comprising calculating the space required for the object using default characteristics, comparing the calculated space requirement to the evaluated size of each area and using the comparison to decide in which of the areas the object would fit, wherein if the object would not fit in any of the areas, setting an area flag and reducing the object size until the object would fit in at least one of the areas.

8. A method according to claim 1, further comprising retrieving from memory a pre-determined value of minimum contrast of default object colour to average colour in an area and if none of the areas satisfies the minimum pre-determined value, setting a contrast flag and modifying the colour of the object to be inserted so that at least one of the areas satisfies the criteria.

9. A method according to claim 1, further comprising retrieving from memory a pre-determined value of maximum permissible rate of change of colour over an area and if all of the areas have a greater rate of change of colour than the maximum permissible rate, setting a variation flag and issuing a warning to the user and allowing the user to select a location for insertion of the object.

10. A method according to claim 9, wherein if the area flag is set and the contrast flag is set and the variation flag is set, allowing a user to modify the object size.

11. A method according to claim 1, further comprising inserting the object in the selected area.

12. A method according to claim 11, further comprising, after inserting the object in the selected area, allowing the user to move the object by manual control.

13. A method according to claim 11, comprising allowing the user to select characteristics of the object and modifying the object according to the selected characteristics.

14. A method according to claim 11, further comprising requesting confirmation from the user that the object has been inserted satisfactorily and if the user indicates that it has, saving the image having the inserted object, but if the user indicates that the object has not been inserted satisfactorily, allowing the user to move the object and/or modify the characteristics of the object.

15. A method according to claim 1, wherein the object is a character string.

16. A method according to claim 1, applied to a mobile telephone.

17. A method according to claim 1, applied to a personal digital assistant.

18. An apparatus comprising:
an image homogeneity assessor configured to assess the homogeneity of an image;
an area identifier configured to identify one or more areas of the image having similar homogeneity according to the assessed homogeneity; and
a selector configured to select a homogeneous region in which to insert the object,
wherein the selector comprises
a retrieving unit configured to retrieve default object characteristics from memory;
a first ranking unit configured to rank the areas in order of size, largest first;
a second ranking unit configured to rank the areas in order of rate of change of colour over each area, lowest first;
a comparator configured to compare the default object colour to the average colour in each area and third ranking the areas in order of contrast to the default character string colour, greatest contrast first;
an applying unit configured to apply a weighting factor to the size, rate of change of colour and average colour of each area;
an overall ranking unit configured to overall rank the regions in which the object would fit in an order based on their first, second and third rankings and the applied weighting factor; and
a selector configured to select the area in which to insert the object that has the highest overall ranking.

19. The apparatus according to claim 18, wherein homogeneity is colour homogeneity.

20. The apparatus according to claim 19, wherein the image homogeneity assessor is configured to assess homogeneity by evaluating a colour number of each pixel of the image.

21. The apparatus according to claim 20, further comprising:
a first evaluator configured to evaluate a size of each area; and
a second evaluator configured to evaluate a variation in colour within each area.

22. The apparatus according to claim 21, wherein the first evaluator is configured to evaluate the size of each area by counting the number of pixels in each area and the second evaluator is configured to evaluate the variation in colour within each area by applying a mathematical transformation to the colour number of each pixel in an area to evaluate a rate of change of colour over each area.

23. The apparatus according to claim 22, further comprising a calculator configured to calculate a value representative of the average colour in the area.

24. The apparatus according to claim 18, further comprising:
a calculator configured to calculate the space required for the object using default characteristics;
a comparator configured to compare the calculated space requirement to the evaluated size of each area and using the comparison to decide in which of the areas the object would fit;
wherein if the object would not fit in any of the areas, a setting unit is configured to set an area flag and reducing the object size until the object would fit in at least one of the areas.

25. The apparatus according to claim 18, further comprising a retrieving unit configured to retrieve, from memory, a pre-determined value of minimum contrast of default object colour to average colour in an area and if none of the areas satisfies the minimum pre-determined value, and a setting unit configured to set a contrast flag and modify the colour of the object to be inserted so that at least one of the areas satisfies the criteria.

26. The apparatus according to claim 18, further comprising a retrieving unit configured to retrieve, from memory, a pre-determined value of maximum permissible rate of change of colour over an area and if all of the areas have a greater rate of change of colour than the maximum permissible rate, a setting unit is configured to set a variation flag and issue a warning to the user and allowing the user to select a location for insertion of the object.

27. The apparatus according to claim 26, wherein if the area flag is set and the contrast flag is set and the variation flag is set, a user is allowed to modify the object size.

28. The apparatus according to claim 18, further comprising an inserting unit configured to insert the object in the selected area.

29. The apparatus according to claim 28, wherein, after the object is inserted in the selected area, the user is allowed to move the object by manual control.

30. The apparatus according to claim 28, wherein the user is allowed to select characteristics of the object and modify the object according to the selected characteristics.

31. A method according to claim 28, further comprising a requester configured to request confirmation from the user that the object has been inserted satisfactorily and if the user indicates that it has, the image having the inserted object is saved, but if the user indicates that the object has not been inserted satisfactorily, the user is allowed to move the object and/or modify the characteristics of the object.

32. The apparatus according to claim 18, wherein the object is a character string.

33. An apparatus comprising:
  image homogeneity assessing means for assessing the homogeneity of an image;
  area identifying means for identifying one or more areas of the image having similar homogeneity according to the assessed homogeneity; and
  selecting means for selecting a homogeneous region in which to insert the object,
  wherein the selecting means comprises
    retrieving means for retrieving default object characteristics from memory;
    first ranking means for ranking the areas in order of size, largest first;
    second ranking means for ranking the areas in order of rate of change of colour over each area, lowest first;
    comparing means for comparing the default object colour to the average colour in each area and third ranking the areas in order of contrast to the default character string colour, greatest contrast first;
    applying means for applying a weighting factor to the size, rate of change of colour and average colour of each area;
    overall ranking means for overall ranking the regions in which the object would fit in an order based on their first, second and third rankings and the applied weighting factor; and
    selecting means for selecting the area in which to insert the object that has the highest overall ranking.

34. A computer program, embodied on a computer-readable medium, the computer program configured to control a processor to perform a method comprising: assessing homogeneity of an image;
  identifying one or more areas of the image having similar homogeneity according to the assessed homogeneity; and
  selecting a homogeneous area in which to insert an object,
  wherein the selecting of the homogeneous area comprises
    retrieving default object characteristics from memory;
    first ranking the areas in order of size, largest first;
    second ranking the areas in order of rate of change of colour over each area, lowest first;
    comparing the default object colour to the average colour in each area and third ranking the areas in order of contrast to the default character string colour, greatest contrast first;
    applying a weighting factor to the size, rate of change of colour and average colour of each area;
    overall ranking the regions in which the object would fit in an order based on their first, second and third rankings and the applied weighting factor; and
    selecting the area in which to insert the object that has the highest overall ranking.

* * * * *